Aug. 4, 1925.

1,548,108

J. A. SWEET

PROCESS OF SEVERING GLASS

Filed May 12, 1921

INVENTOR
John A. Sweet
by
James C. Bradley

Patented Aug. 4, 1925.

1,548,108

UNITED STATES PATENT OFFICE.

JOHN A. SWEET, OF PITTSBURGH, PENNSYLVANIA, ASSIGNOR TO PITTSBURGH PLATE GLASS COMPANY, A CORPORATION OF PENNSYLVANIA.

PROCESS OF SEVERING GLASS.

Application filed May 12, 1921. Serial No. 468,915.

*To all whom it may concern:*

Be it known that I, JOHN A. SWEET, a citizen of the United States, and a resident of Pittsburgh, in the county of Allegheny and State of Pennsylvania, have made a new and useful invention in Improvements in Processes of Severing Glass, of which the following is a specification.

The invention relates to a process for severing glass and particularly sheet glass such as that produced by a continuous drawing operation. Such glass is produced in a continuous band or ribbon, and unless the glass is thoroughly annealed, difficulty is experienced in cutting it into separate sheets without a relatively large amount of breakage. The invention is not limited, however, to cutting glass produced as a continuous sheet, but is of general application in cutting all kinds of sheet glass and for cutting or severing glass articles other than sheets. One means of practicing the invention is illustrated in the accompanying drawing, wherein:—

Figure 1:
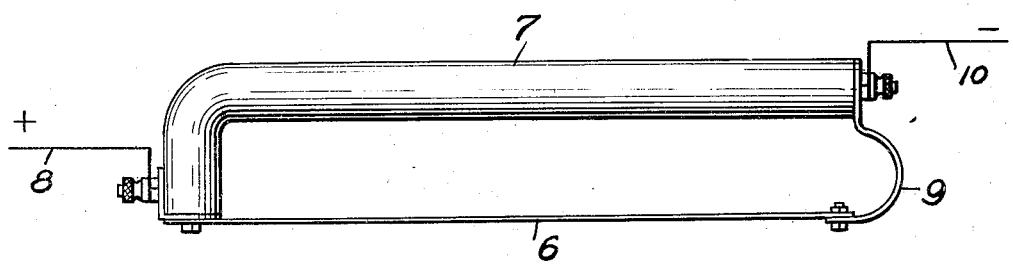
Figure 2:
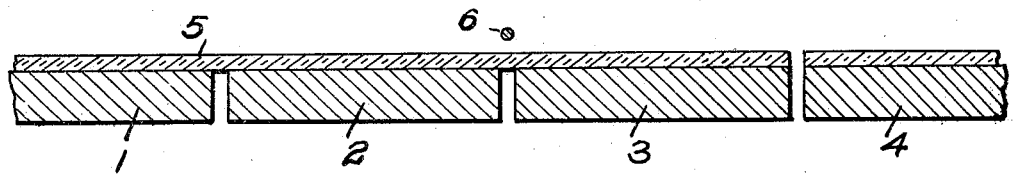

Figure 1 is a sectional view showing in simple form a glass sheet upon a table with the cutting element in position above the table, and Fig. 2 is a side elevation of the severing element and its support.

Referring to the drawings, 1, 2, 3 and 4 are the sections of a support or table for the glass sheet 5 which is to be severed, and 6 is the severing element which may be carried upon a transverse bar 7 of suitable insulating and heat resisting material. The severing element 6 is preferably a wire of chromel secured at one end to the bar 7 and connected to the lead 8, while the other end of the element 6 is secured to the spring 9 for holding the wire 6 under tension, such spring having connected thereto a second lead 10, current being supplied from any suitable source of supply.

The wire 6 is heated by the passage of the electric current to a relatively high temperature, which may vary through considerable limits but is preferably about 1800° F., and this wire is preferably about one-eighth of an inch in diameter, although this dimension is also capable of considerable variation. To sever the glass the wire is pressed down upon the sheet opposite the passage between two of the members, such as 2 and 3, and the heat of the member is such that it softens the glass and practically melts its way through the sheet. The period of contact necessary to accomplish this severing action is relatively short and the wire cuts its way through the glass without difficulty. In order to prevent the cracking of the glass, the sheet must have a relatively high temperature before the wire is applied thereto. My experiments have indicated that this temperature should be upwards of 700°, preferably in the neighborhood of 1000° as the danger of shattering the glass increases with the drop in temperature. The glass may be successfully severed at temperatures above 1000°, but at such temperatures the softening point of the glass is approached and the danger of marring the glass where it contacts with its supporting table or other supporting means is increased. The setting point of glass ranges somewhere between 1050° and 1200° F., so that it is desirable that the sheet be below the 1050° point in temperature, but as near this point as it is safe to operate without danger of marring the glass.

As stated heretofore, the invention has its largest field in severing a continuously formed or drawn band or ribbon of sheet glass and the process is applicable whether the sheet is being carried forward horizontally, as indicated in Fig. 1, or whether it is being carried vertically, and the severing may be very conveniently accomplished just after the formation of the sheet and while it retains the heat imparted to it in the tank or pot from which it is drawn, so that no reheating is necessary in order to get the sheet above the temperature point in order to secure safety from shattering in applying the heated element to the glass. Under these conditions it is preferable to apply the wire after the glass has set, so that there will be no marring of the surface of the sheet where it engages its support or the drawing means. At least the surface of the sheet should be set, although the central layer of glass in the sheet may be at a temperature above the setting point.

The wire is shown as starting above the sheet, but this might be reversed and the wire might start beneath the sheet in the spaces between the supports 2 and 3, so that the glass is severed by an upward movement. The composition of chromel (nickel and chromium) is mentioned as preferably employed for the wire, but any other suitable composition may be employed which can be heated to a high temperature without fusing or deteriorating. The invention is also not limited to the use of an electrically heated severing element, although this is preferred as it permits the use of a severing element of smaller cross section than would be the case if the heating element were brought up to the severing temperature between operations by some method of heating other than passing a current of electricity through the wire. The operation is illustrated as accomplished upon a supporting table in sections and by means of a hand tool, but this is merely for simplicity of illustration as the process may be carried out in an automatic machine and is applicable where no supporting table is employed and with the sheet moving in various directions aside from horizontally. In those cases in which the sheet of glass is moving continuously, it is, of course, desirable that provision be made for moving the heating element in the same direction as the glass and at the same speed during the application of the element to the glass. If desired, in those cases employing a table or support which is moving either horizontally or vertically in connection with a continuously moving sheet, the table or support, instead of being made in sections, may be continuous and provided with transverse recesses beneath the lines of cut to receive the wire after it passes through the sheet.

The feature of cutting continuously drawn glass while at a relatively high temperature, by my process, has a great advantage over cutting such glass by a diamond or wheel after it is cooled, since all danger of breakage is avoided, while with the diamond or wheel cutting there is a large amount of breakage unless the glass is well annealed. This annealing requires costly apparatus and if the continuous ribbon is broken during such period, the loss is very great as the glass may split longitudinally for considerable distances and may tend to cause breakage in the band of glass following. With my operation this danger is avoided as every sheet is an independent unit and annealing of a very ordinary character is sufficient.

In the preferred practice of the process as heretofore described, the glass is referred to as being at a relatively high temperature although below the setting point, but it will be understood that my invention is not limited to the severing of a sheet or body of glass which is set from one side to the other, as glass is a very poor conductor of heat and the sheet or body which is apparently set and has a hard surface may be slightly plastic upon the interior and may have a temperature which is considerably above that of the surface. The reference to severing after the glass sets therefore refers primarily to the condition of the surface of the glass, although in most cases a glass sheet which is set in so far as its surface is concerned is also set throughout its thickness, except perhaps in the case of very thick sheets.

What I claim is:

1. A method of severing a glass article while said article is maintained at a relatively high temperature to prevent cracking thereof, which consists in applying to the article an electrically heated severing element maintained at a temperature such and applied for a period of time such that it melts its way through the glass.

2. A method of severing sheet glass which consists in applying thereto while the glass is at a relatively high temperature, but below the setting point a heated severing element along the desired line of cut, the temperature of the element and period of application to the glass being such as to soften the glass to permit the severing by the element.

In testimony whereof, I have hereunto subscribed my name this 9th day of May, 1921.

JOHN A. SWEET.